United States Patent
Lee et al.

(10) Patent No.: US 7,576,846 B2
(45) Date of Patent: Aug. 18, 2009

(54) APPARATUS AND METHOD OF NON-SAMPLING-BASED Q-FACTOR MEASURING

(75) Inventors: San-Liang Lee, Taipei (TW);
Chun-Liang Yang, San-Chung (TW);
Dar-Zu Hsu, Tai-Nan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 493 days.

(21) Appl. No.: 11/323,676

(22) Filed: Dec. 30, 2005

(65) Prior Publication Data

US 2007/0109533 A1 May 17, 2007

(30) Foreign Application Priority Data

Nov. 17, 2005 (TW) .............. 94140467 A (51) Int. Cl.
*G01N 21/00* (2006.01)
(52) U.S. Cl. .............. 356/73.1; 398/43; 398/110
(58) Field of Classification Search ........... None
See application file for complete search history.

(56) References Cited

U.S. PATENT DOCUMENTS

| 6,178,273 | B1 | 1/2001 | Kuga ............ 382/305 |
| 6,430,715 | B1 | 8/2002 | Myers et al. ........ 714/704 |
| 6,720,548 | B2 | 4/2004 | Otani et al. ......... 250/225 |
| 2003/0007205 | A1 | 1/2003 | Lee et al. ............ 359/110 |
| 2004/0213586 | A1* | 10/2004 | Gu et al. ............ 398/203 |

OTHER PUBLICATIONS

Q-factor Monitoring in Optical Channel Performance Monitoring Techniques Dar-Zu Hsu, Chun-Liang Yang CCL Technical Journal Sep. 25, 2005.
Simple Measurement Of Eye Diagram And BER Using High-Speed Asynchronous Sampling Ippei Shake, Member, IEEE, Hidehiho Takara, Member, IEEE, and Satoki Kawanishi, Member IEEE, Memer, OSA 2004 IEEE.

\* cited by examiner

*Primary Examiner*—Tarifur Chowdhury
*Assistant Examiner*—Tara S Pajoohi (57) ABSTRACT

A non-sampling-based Q-factor measuring apparatus and method use a power conversion module to transform the power variation of inputted optical signals in time domain into the variation in other domains, such as optical wavelength, optical polarization and different output ports of optical elements. Taking optical wavelength as an example, different levels of power variation respond different outputs of wavelength variation through the use of a power-to-wavelength conversion module. An optical filter then separates the inputted optical signals with different wavelengths. The power average of a wavelength for its corresponding optical signals is further calculated by a photo detector. Thereby, the information of the power variation for the inputted optical signals at levels 1 and 0 can be obtained, and the Q-factor for the inputted optical signals is easily measured.

8 Claims, 11 Drawing Sheets

APPARATUS AND METHOD OF NON-SAMPLING-BASED Q-FACTOR MEASURING

FIELD OF THE INVENTION

The present invention generally relates to a technique for optical signal measuring, and more specifically to an apparatus and method of non-sampling-based Q-factor measuring.

BACKGROUND OF THE INVENTION

The out blooming of information explosion as well as the rapid expanding of the worldwide networking applications naturally trigger the growing demand for channel bandwidth for data and signal transformation. The 10 Gbps Ethernet Standard for optical networking was announced in 2002. The major key to the current technology development and compatibility effort focuses on methods for fast and efficient information retrieval and transformation. The highly advanced information technology development countries in Europe, the United States, and Japan, all gear on aggressive research and development effort to achieve mass data information transformation via high speed optical networking as the foundation for information high way development.

Under the trend of high speed optical networking/complete optical networking, the distance for efficient transmission has also been expanded. Other than decreased number of the conventional electrical networking nodes, the functional monitor on an electrical networking node also has to gradually disappear by itself. This naturally directs the trend for networking development into technologies providing a complete optical network with the functional monitor capability in a traditional electrical network. The quality of an optical signal is evaluated through the measurements of the power, wavelength, optical signal-to-noise ratio (SNR), etc., of the optical signals. For digital transmission systems, especially, two key measurements, the bit error rate (BER) and the Q-factor, are commonly evaluated for functionality index to more accurately monitor the quality of optical signals.

The detection for the bit error rate requires more complicated equipment, and the time required for detecting a lower BER takes even longer. Taking the example for transmitting signals at 10 Gbps, the time for detecting a BER value which is smaller than 10E-15, is 27 hours. For bulky video/audio signals, the BER measuring is hard to effectively perform the real-time quality monitoring to discover/prevent problems. Under such circumstances, the Q-factor measuring, with the advantage of being theoretically equivalent BER, which can be evaluated via speedy measurement, can thus replace BER as a reliable parameter for the system functionality assurance. While BER measuring requires receiving all signals and can only be able to perform at the receiving end, the Q-factor measuring has the advantage of performing the evaluation at any communication node in the signal transformation routing, without the need to stop transmitting signals. Compared with BER measuring, the Q-factor measuring provides more flexibility and is more suitable for the quality assurance for the real-time video/audio signal transmission system.

The definition of Q-factor is as follows:

$$Q = \frac{m_1 - m_0}{\sigma_1 + \sigma_0},$$

wherein, the $m_1$, $m_0$ represent the measured mean values, while the receiving optical signals are 1 and 0, respectively.

Figure 1:
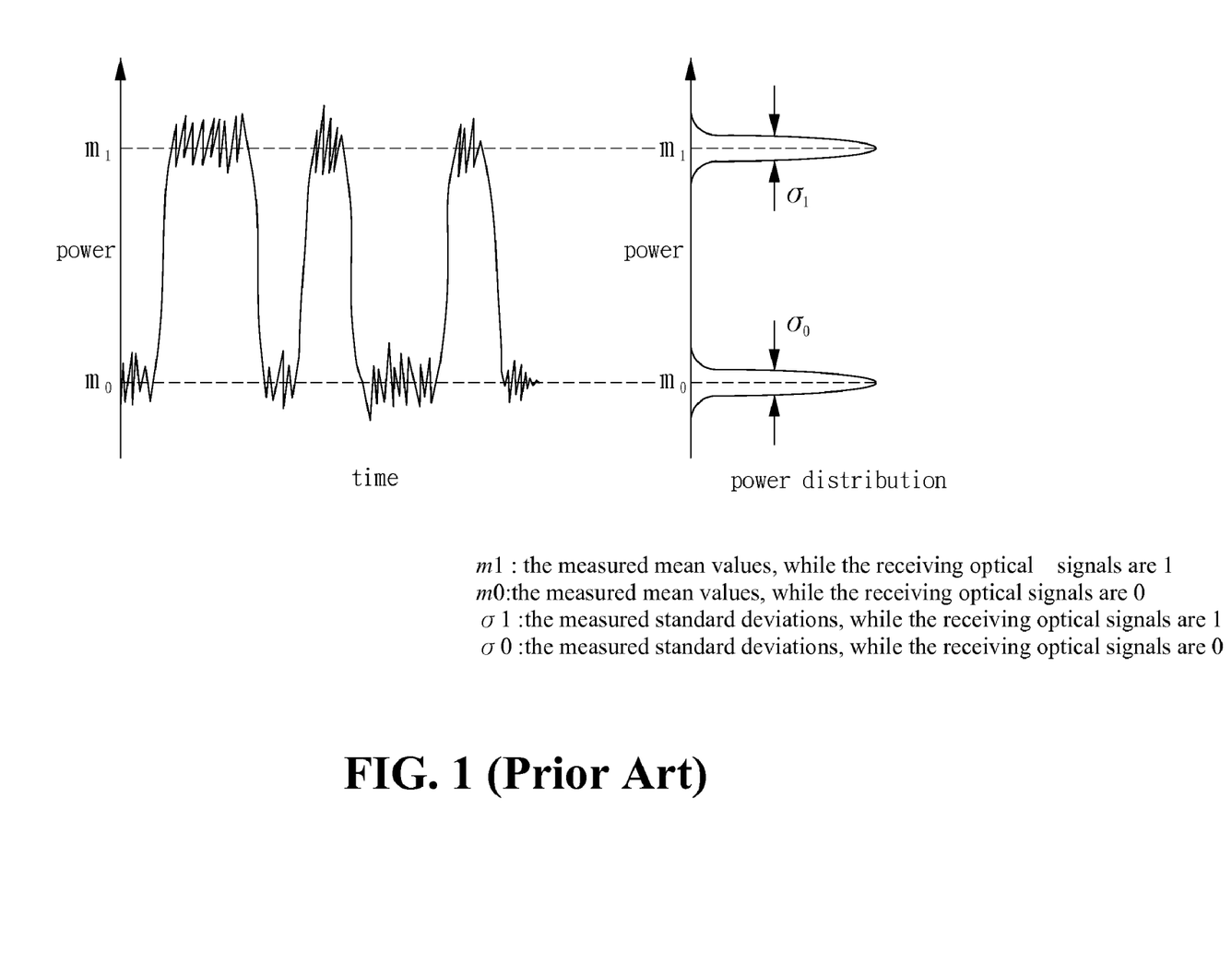
FIG. 1 illustrates the conventional definition of Q-factor.

$\sigma_1$, $\sigma_0$, on the other hand, represent the measured standard deviations, while the receiving optical signals are 1 and 0, respectively. This is illustrated in FIG. 1.

With a Gaussian distribution for the noise probability and the inter symbol interference (ISI) meets the condition for ignorance, the relationship between the Q-factor and the BER at the receiver end can be expressed as follows:

$$BER = \frac{1}{2}\mathrm{erfc}\left[\frac{Q}{\sqrt{2}}\right] \approx \frac{\exp(-Q^2/2)}{Q\sqrt{2\pi}}.$$

Figure 2:
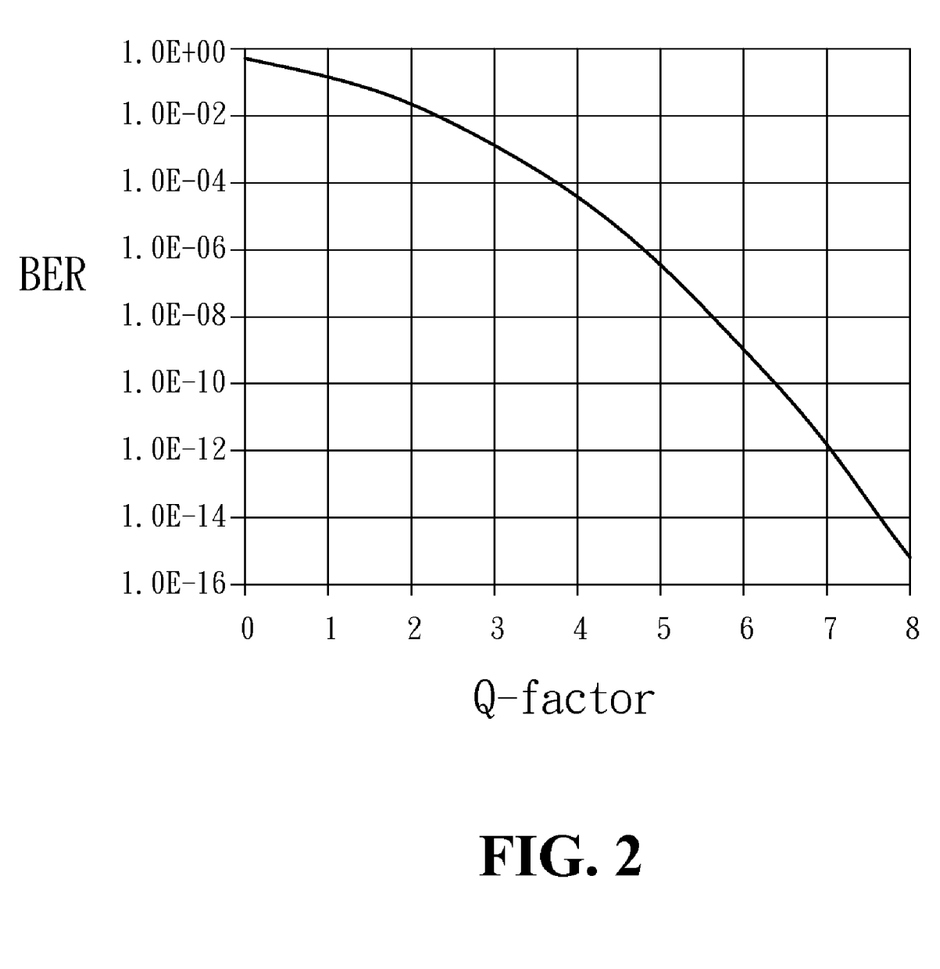
FIG. 2 illustrates the relationship between the conventional Q-factor and BER.

The graphics for the above relationship is shown in FIG. 2.

In general, the Q-factor measurement needs sampling mechanism to detect the optical power variation of the input signals at the 1/0 levels, that's why it needs sampling pulse to trigger the sampling process. Higher speed of signal transmission needs narrower time period of the sampling pulses. Using the 10 Gbps signals as an example, the corresponding time period of the sampling pulse should be at least smaller than 100 nano seconds. Generating narrower time period of sampling pulses for increased transmission speed is complicated in both optical domain and electrical domain.

U.S. Pat. No. 6,720,548 disclosed a Q-factor monitoring technique which utilizes multiplexed measuring object light and sampling light to enter a nonlinear optical crystal and do the sampling process in the optical domain. This process, however, is very expensive for its high powered optical sampling pulses.

Another U.S. Pat. No. 6,430,715 disclosed an alternative Q-factor monitoring technique by using two detecting circuits to determine the best threshold. Since this technique needs to pre-convert the optical signals back to electrical signals, it requires an expensive high-frequency photo detector.

Figure 3:
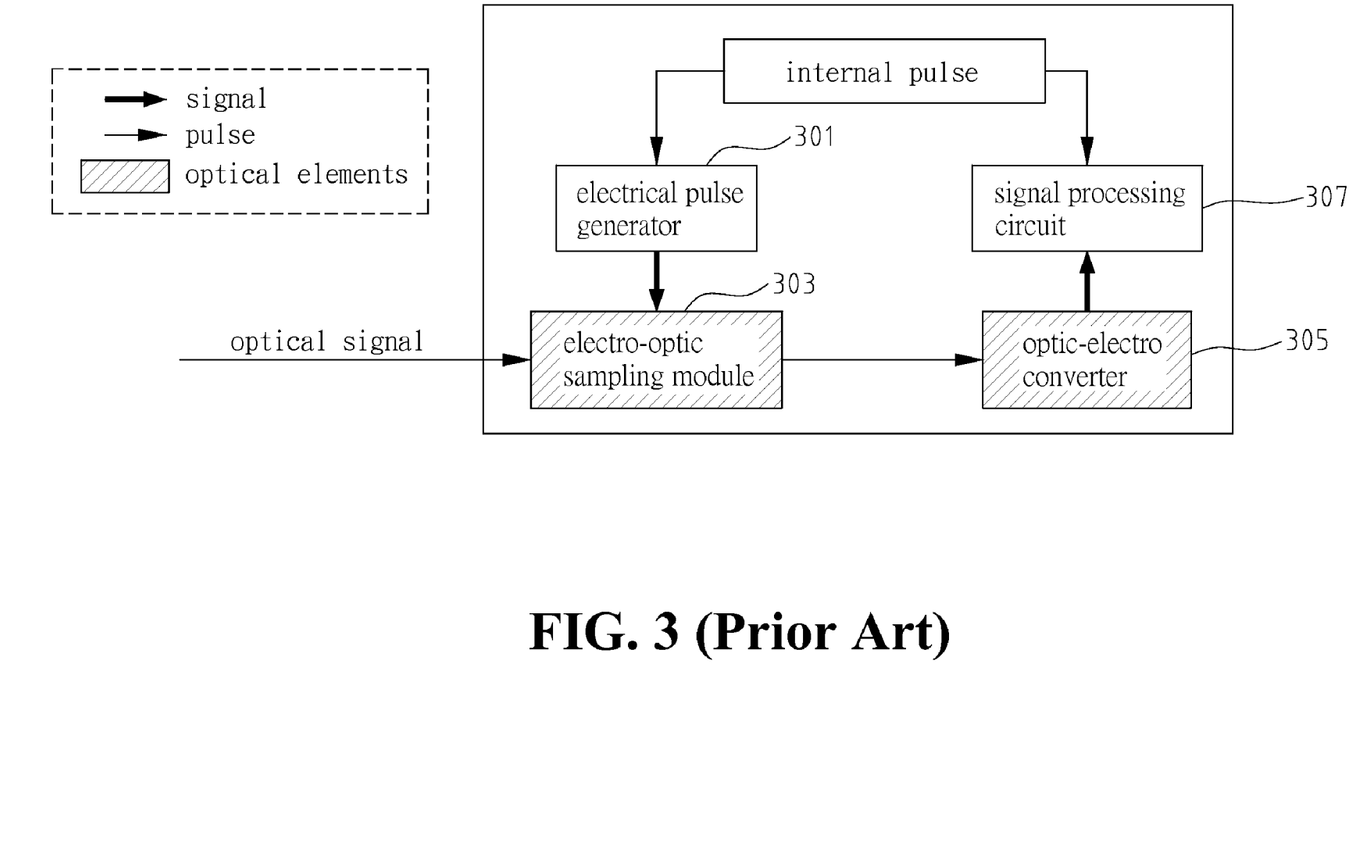
FIG. 3 shows a schematic diagram of a conventional Q-factor monitor system.

In an article entitled "Simple Measurement of Eye Diagram and BER Using High-Speed Asynchronous Sampling" in the IEEE Journal of Lightwave Technology, vol. 22, pp. 129-1302, May 2004, Ippei Shake, Hidehiko Takara, and Satoki Kawanishi proposed an asynchronous sampling technique. FIG. 3 shows the schematic diagram of its Q-factor monitoring system. In this system, the internal pulse is a 1 GHz repetitive electrical pulses using electrical absorption modulator as an electro-optic sampling module 303. The electrical pulse generator 301 and the electro-optic sampling module 303 are smaller and simple compared with the previous conventional sampling system modules. The corresponding optic-electro converter 305 does not have the restriction, in which the bandwidth has to be greater than the speed of the signal transmission compared with the previous conventional sampling systems.

In this technique of the article, the sampling speed is slower than the transmission speed of signals. The resulting asynchronous sampled Q-factor value from the analytical sampling of the signal processing circuit 307 of the system is called $Q_r$. The average of all $Q_r$ values is called $Q_{avg}$. In order to obtain the sampling speed of the internal circuit, the signal transmission speed has to be predetermined, such as SONET/SDH, Ethernet, etc. Those are with different transmission standards. If the system is not using the clock fetch technology, the signal frequency cannot be accurately obtained. Therefore, the sampling frequency for the internal circuit has to be independently determined. In other words, this process also implies possibly increased measurement deviation.

There also are some related techniques which use random factor to determine the sampling frequency for the internal circuit. This type of techniques, however, still needs some predefined threshold values for the levels 1 and 0 to determine the data ranges for the target statistics. This approach of measuring technique results in even greater data deviation.

In summary, the foregoing related conventional techniques for optical signal sampling, the asynchronous sampling technique although is simpler, but the requirement for meeting the characteristic regulation for the electrical absorption/electro-optic modulator sampling module is also pretty strict. With even higher transmission speed, the electrical characteristics of the signal processing circuit seriously affects the quality of the optical signal measurement.

SUMMARY OF THE INVENTION

To overcome the drawback of the foregoing conventional optical signal measurement processes with sampling techniques, the present invention provides a non-sampling-based Q-factor measuring apparatus and method. With a power conversion module, the present invention converts the power variation of input optical signals in time domain into the variation in a non-time domain and accomplishes the same result from the signal sampling mechanism. Via an equivalent non-time variant analytical mechanism, the mean and standard deviation of the power variation for the input optical signals at levels 1 and 0 can be obtained, and the Q-factor for the input optical signals is easily measured.

According to the present invention, optical signal power variation can be converted into the equivalent quantities in non-time variant domains, such as optical wavelength, optical polarization, and different output ports of optical devices, etc.

In the first embodiment of the present invention, the optical signal power variation in time domain is converted into the equivalent wavelength variation in non-time domain. The non-sampling-based Q-factor measuring apparatus is accomplished by a power-to-wavelength conversion module, an optical filter, and a photo detector.

According to the measuring result from the experimental simulation, via the power-to-wavelength conversion module, the correspondence relationship between the converted output wavelength variation and the input optical power variation does exist. In other words, by analyzing the average optical power variation from the constitution of wavelength in optical domain, the power variation of the input optical signals at levels of 1 and 0 can be obtained as two distinct wavelengths from the optical spectrum.

In the second embodiment of the present invention, the optical signal power variation in time domain is converted into different output ports of an optical device. Accordingly, the non-sampling-based Q-factor measuring apparatus is accomplished by a nonlinear directional coupler connected to a low frequency photo detector. Due to Kerr electro-optical effect, input optical signals with higher power exit via one of the output port, while input optical signals with lower power exit via another output port. Input optical signals at levels of 1 and 0 can thus be separated. By calculating the respective statistical mean and standard deviation values, the Q-factor can be easily measured.

In the third embodiment of the present invention, the optical signal power variation in time domain is converted into optical polarization. The non-sampling-based Q-factor measuring apparatus is accomplished by a broadband amplified spontaneous emission (ASE) light source, which is connected to a polarization beam splitter (PBS), and combined with the input signals via an optical coupler. The combined optical signals are then fed into a semiconductor optical amplifier (SOA). The output of the SOA connects to an optical polarization controller (PC) and a linear polarizer. The whole unit is then finished by adding an optical spectrum analyzer (OSA) in the back.

The measuring result from the experimental simulation shows that the different optical power values result in different optical notch wavelengths from the spontaneous emission light source. The relationship between the optical power variation and the corresponding notch wavelengths retains pretty good linearity. By measuring the notch wavelength, power variation for the input optical signals can be indirectly evaluated, and the associated Q-factor can also be calculated.

Through the non-sampling-based mechanism in the embodiments of the present invention, the Q-factor measuring can be easily accomplished without the drawbacks/restrictions in the conventional optical signal sampling mechanism.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

As fore mentioned, the present invention provides a non-sampling-based Q-factor measuring apparatus and method, which utilizes an optic power conversion module to convert the power variation of input optical signals in time domain into the variation in a non-time domain and replaces the conventional signal sampling mechanism for the same Q-factor measurement.

According to the present invention, the output of the optic power conversion connects to a non-time variant analytical mechanism. Via the non-time variant analytical mechanism, the statistical mean and standard deviation of the corresponding power variation in the non-time variant domain for the input optical signals at levels of 1/0 is obtained, and the Q-factor for the input optical signals is also easily measured.

With the present invention, the optic power variation in time domain can be transformed into non-time variant quantities, such as optical wavelength, optical polarization, and different output ports for optical elements/devices, etc. The mechanism and method for each example of transformation is demonstrated by the first embodiment to the third embodiment of the present invention, respectively.

Figure 4:
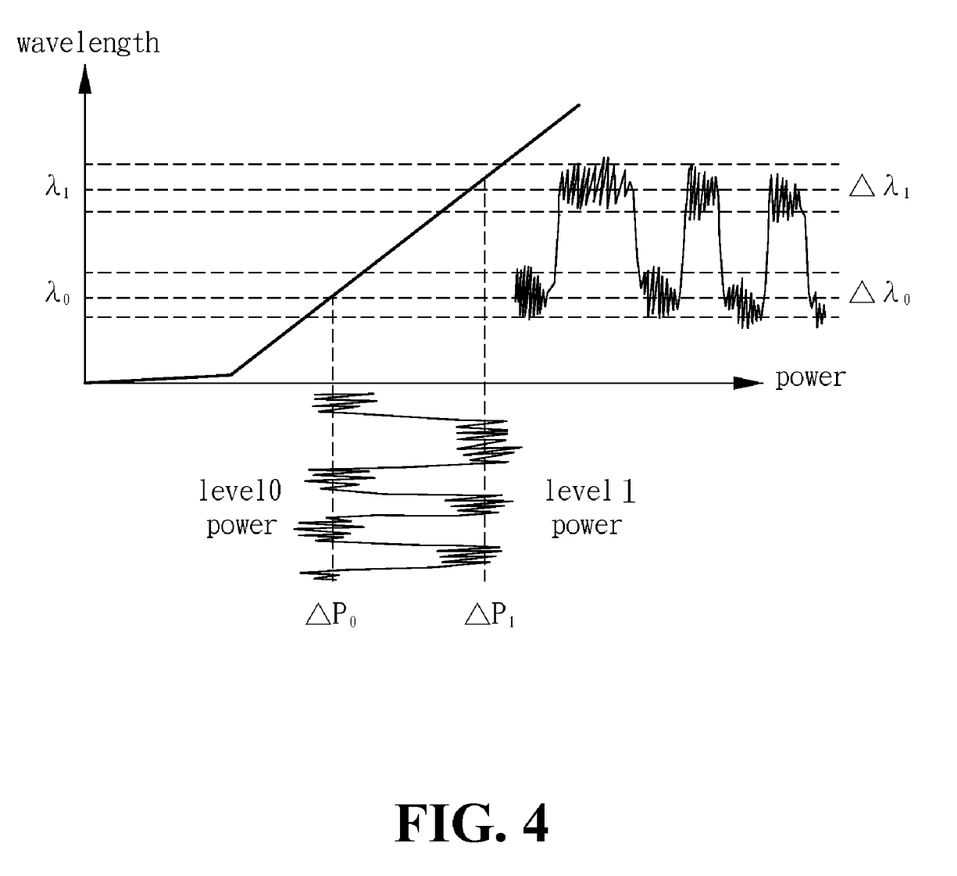
FIG. 4 is a diagram illustrating how the power variation of optical signals in time domain is converted into the equivalent wavelength variation in the optical wavelength domain.

FIG. 4 is a diagram for the conversion from the optic power variation in time-domain into optical wavelength variation in the non-time domain, which illustrates the correspondence relationship between the power variation for the input optical signals at levels of 1/0 and the responding output wavelength variation in the non-time domain. For example, the power variation for level 1 is $\Delta P_1$, while the power variation for level 0 is $\Delta P_0$. After the power-to-wavelength conversion, the corresponding wavelength variation values are $\Delta\lambda_1$ and $\Delta\lambda_0$ respectively. Wherein, the $P_1$ and $P_0$ are the optical power variation at levels 1 and level 0, respectively; while $\lambda_1$ and $\lambda_0$ are the wavelengths for level 1 and level 0, respectively.

Figure 5:
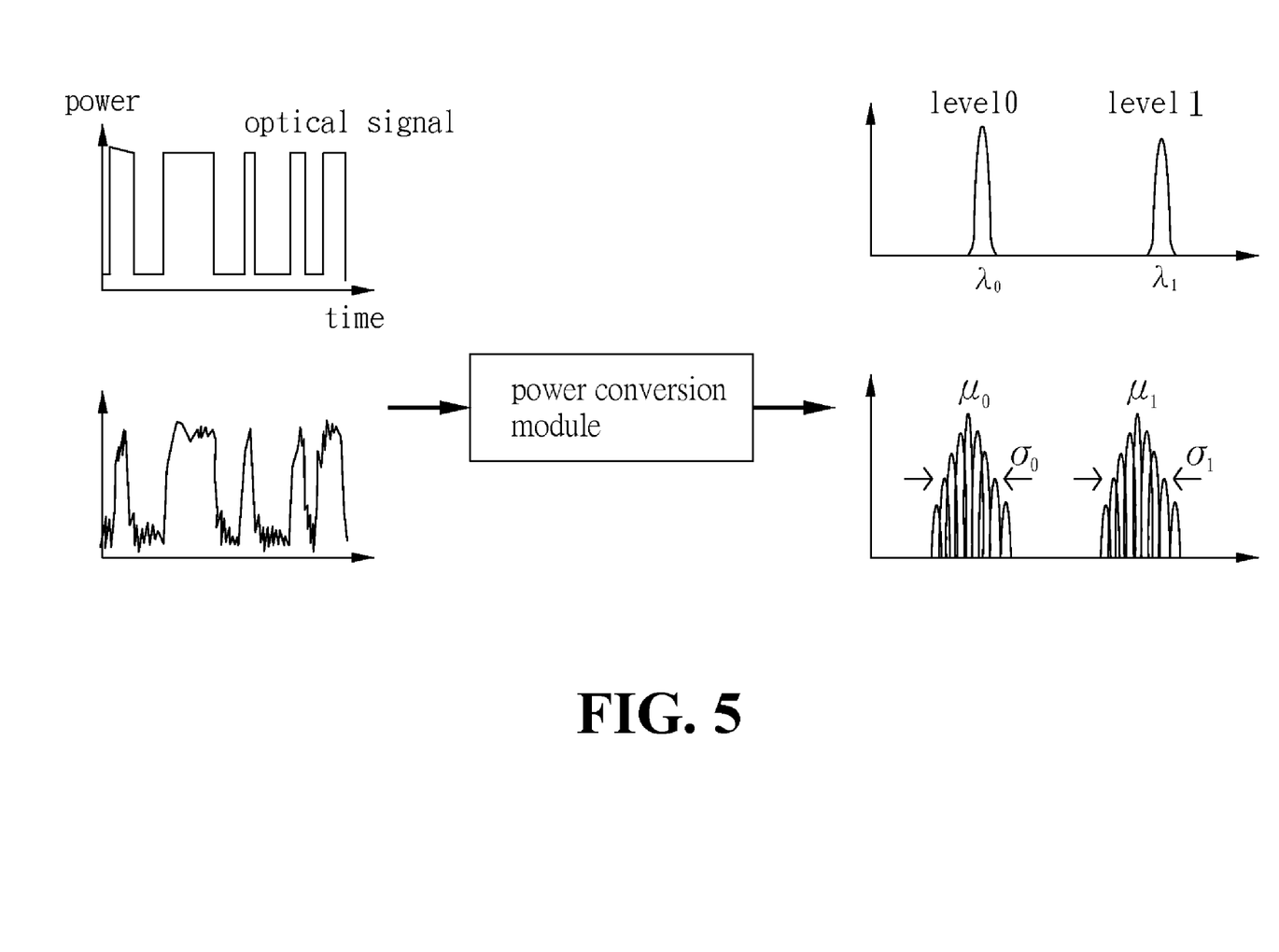
FIG. 5 is a diagram illustrating how the power variation of optical signals in time domain is converted into the wavelength in wavelength spectrum.

Referring to FIG. 5, with only two levels of input optical signals in time domain, through the power-to-wavelength conversion module, there are also only two responding output colors of wavelength. In time domain, an ideal 1/0 inputted waveform, through the power-to-wavelength conversion module, should only result in two wavelength variations on the wavelength spectrum. If normal inputted optical signals pass through the power-to-wavelength conversion module, there are also other wavelength distributions around the two distinct wavelength variations on the wavelength spectrum.

After the foregoing conversion, using one optical filter and one low frequency photo detector to analyze the mean optical power for different wavelength, the power variation for the input optical signals at levels of 1 and 0 can be obtained.

Figure 6:
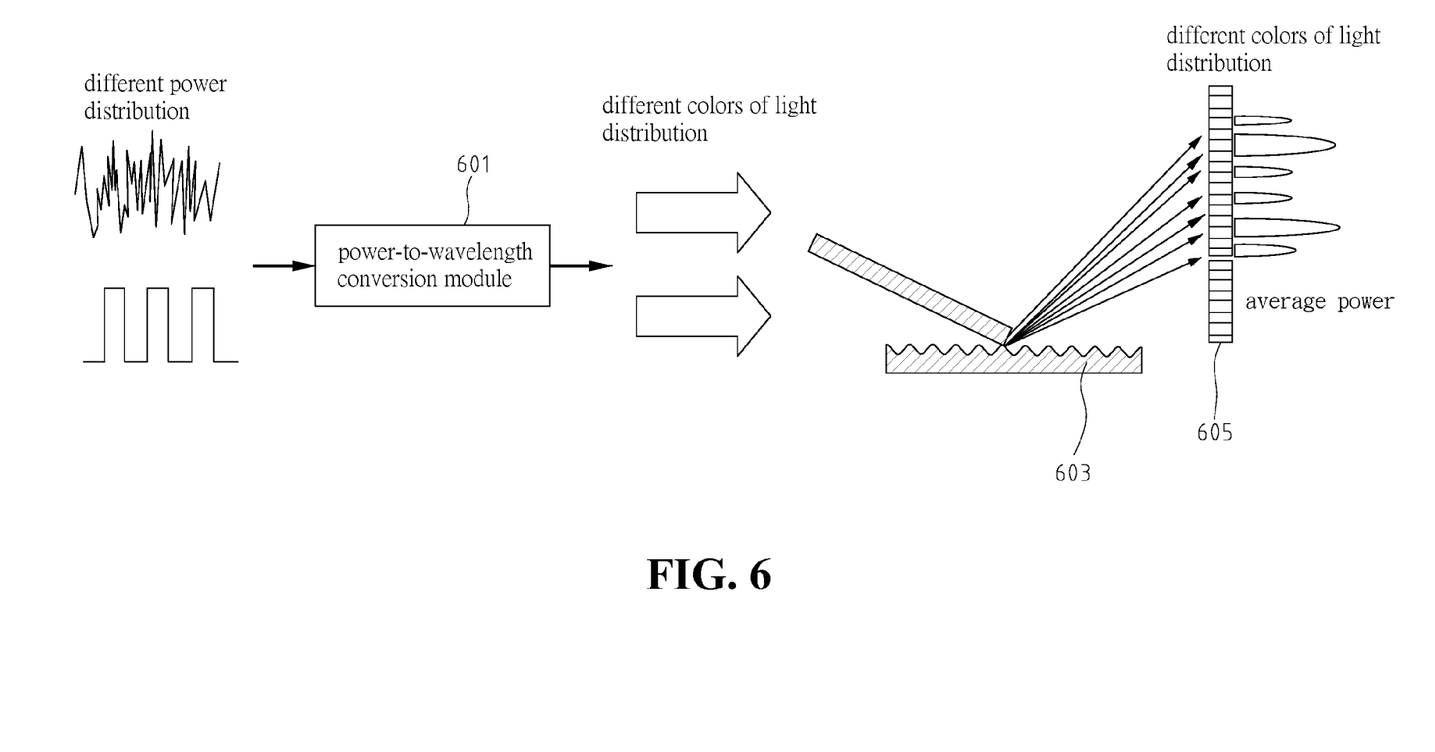
FIG. 6 is a schematic diagram of the first embodiment of the present invention.

Accordingly, the first embodiment of the present invention for a non-sampling-based Q-factor measuring apparatus mainly comprises a power-to-wavelength conversion module 601, an optical filter 603 and a photo detector 605, as shown in FIG. 6 This measuring apparatus has the advantage of being simple structured without the complicated mechanism for supper short time period sampling pulses.

Referring to FIG. 6, optical signals with different levels of input power result in different output colors of light (different colors of light means different wavelengths of light), via the use of the power-to-wavelength conversion module 601. The measuring apparatus of the present invention further uses the optical filter 603 to separate light beams with different colors. Finally, it uses the photo detector 605 to calculate the statistical mean optical power value for each individual color of light. The power variation for the input optical signals at levels of 1/0 can be obtained, and the corresponding Q-factor can also be easily measured. In this case, the ratio of appearance for different colors of light represents the corresponding ratio of appearance for optical power of different levels of input optical signals.

Figure 7:
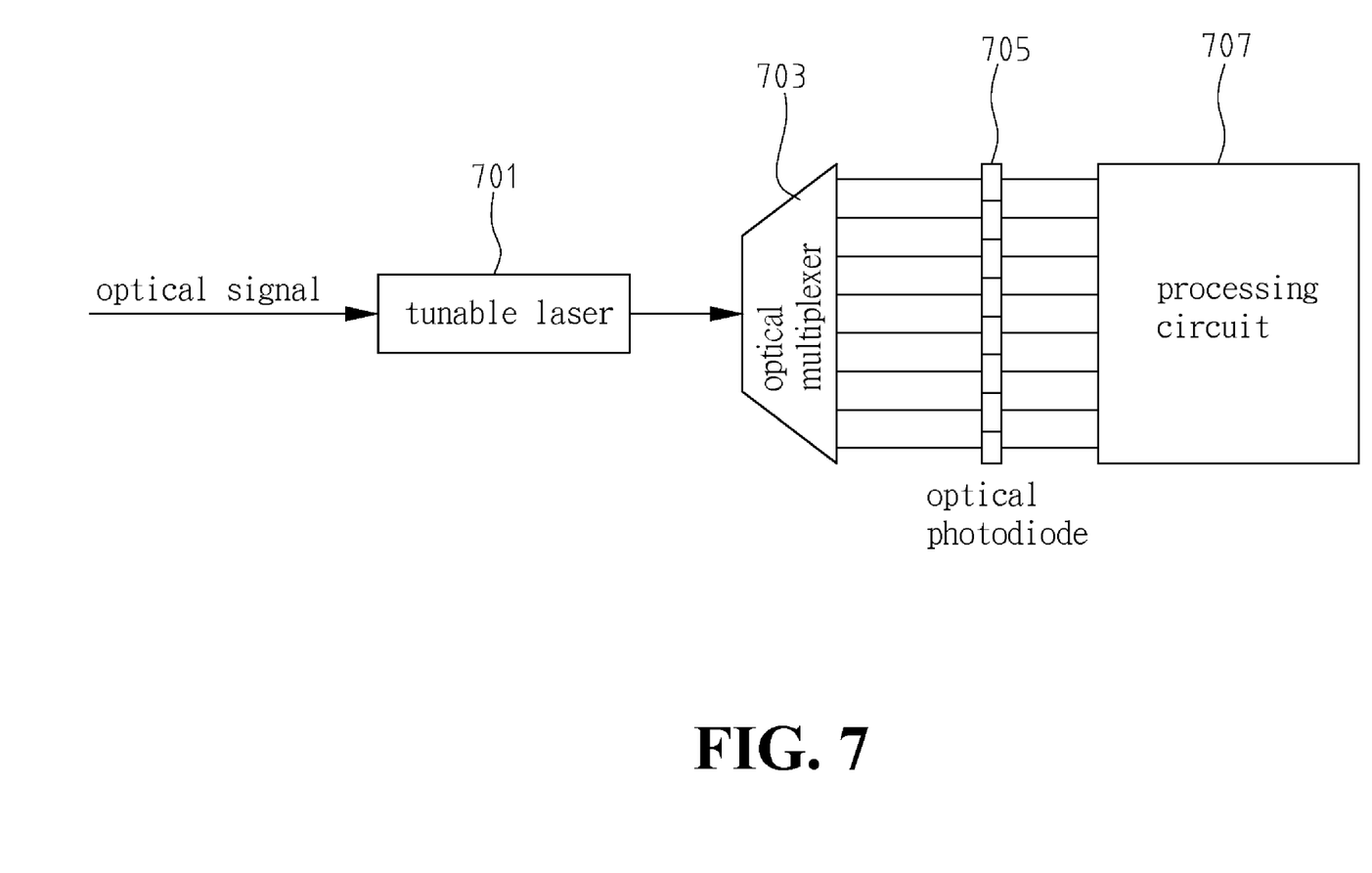
FIG. 7 is a diagram of an example shown in FIG. 6.

The power-to-wavelength conversion module 601 can be realized by optical elements or modules, such as a tunable laser, which can associate a light emission wavelength with its input optical power. A tunable laser modulates the wavelength of its emitting light by varying the optical refraction index of the internal materials. The internal optical refraction index of a tunable laser is modulated by different potentials applied on the electric poles. Different powers of input optical signals, however, can also alter the internal optical refraction index of a tunable laser and affect the characteristics of the output wavelength. The optical filter 603 and the photo detector 605 can be realized by an optical multiplexer with light filtration and an optical photodiode, respectively. FIG. 7 illustrates a diagram of such an example.

Referring to FIG. 7, input optical signals are fed into the tunable laser 701. The power variation of the input optical signals at level of 1 and 0 can alter the internal optical refraction index of the tunable laser 701, and cause the corresponding variation in the responding output wavelength. By connecting the output of the tunable laser 701 to an optical multiplexer 703, signals with different wavelength are distributed onto different output ports. By connecting each output port of the optical multiplexer to an associated optical photodiode 705, the mean and standard deviation of power variation for each different wavelength can be detected/collected. The detected/collected values are finally calculated via the post processing circuit 707. The Q-factor for the input optical signals is also measured.

Figure 8A:
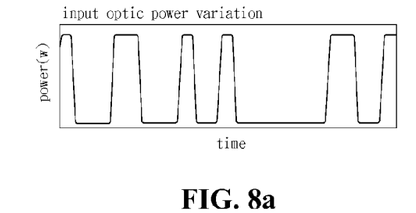
FIG. 8a-FIG. 8c show the resulting measurement from the simulation for the first embodiment of the present invention.
Figure 8B:
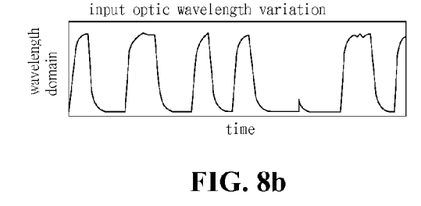
Figure 8C:
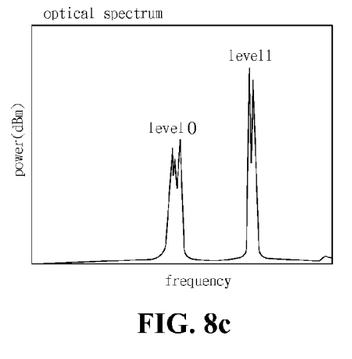

FIGS. 8a-8c illustrate the resulting measurements from the experimental simulation for the first embodiment of the present invention. In this simulation, FIG. 8a shows the optical power variation in time domain for input optical signals at 2.5 Gbps. After the conversion via the power-to-wavelength conversion module, the output wavelength variation demonstrates the correspondence relationship with the input optical power variation, as shown in FIG. 8b. By analyzing the mean optical power variation for different optical wavelengths in optical domain, the power variation for the input optical signals at levels of 1 and 0 can be obtained. As shown in FIG. 8c, there are two distinguishable output wavelengths appearing on the optical spectrum. This embodiment of the present invention thus demonstrates a non-sampling-based mechanism for Q-factor measuring without the drawbacks and restrictions from a conventional mechanism for signal sampling.

Figure 9:
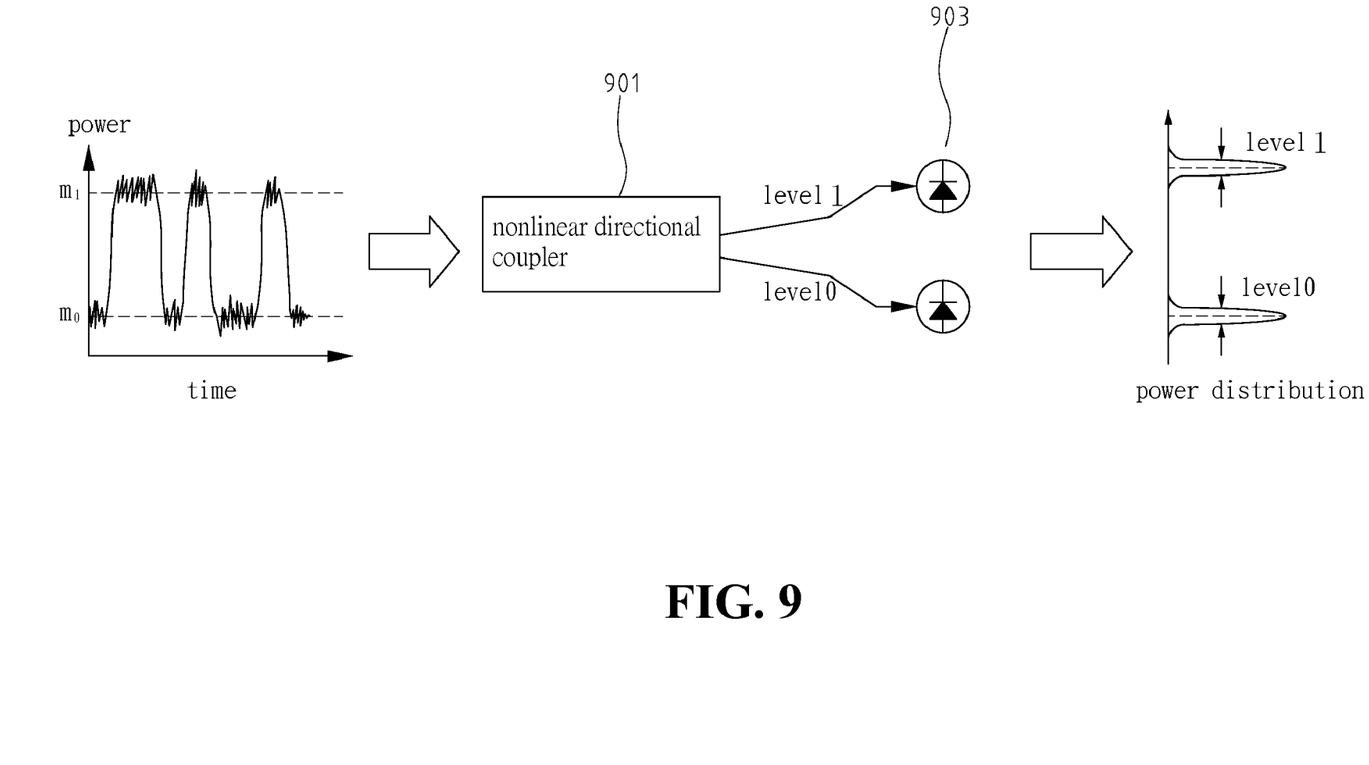
FIG. 9 is a schematic diagram of the second embodiment of the present invention.

FIG. 9 shows a schematic diagram of the second embodiment of the present invention. In this second embodiment, due to Kerr effect, optical signals with different power, after being fed into a nonlinear directional coupler 901, result in output from different ports. As shown in FIG. 9, according to predetermined thresholds, optical signals with different powers are distributed onto separate output ports. This process automatically separates the input optical signals at levels of 1 and 0. In other words, the output from an input optical signal at level of 1 or 0 will appear at respective output port on the nonlinear directional coupler 901. Each output port connects to a low frequency photo detector 903 to calculate the statistic values of the power variation for the input optical signals at the levels of 1 and 0. Similarly, the statistic values are finally calculated via the post processing circuit and the Q-factor is measured for the input optical signals without the drawbacks and restrictions of a conventional mechanism for signal sampling.

Figure 10:
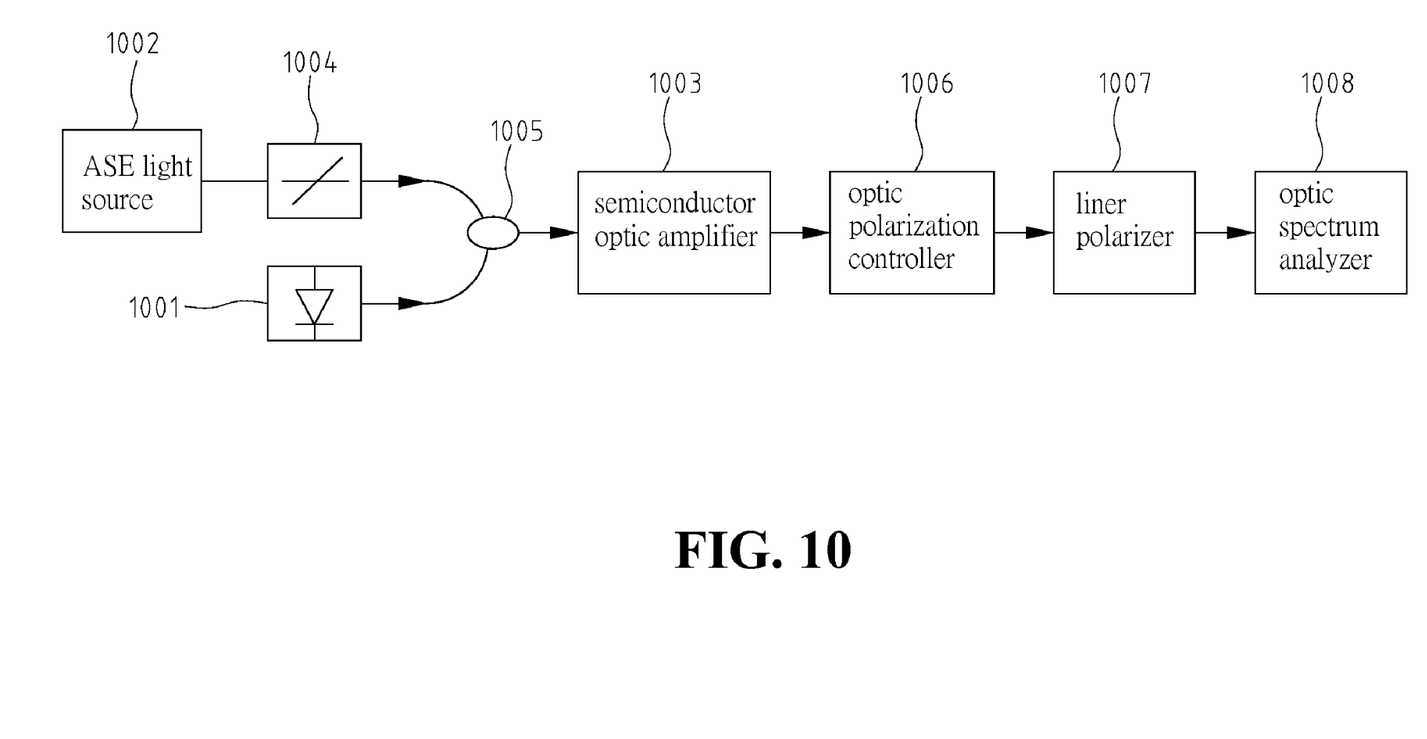
FIG. 10 is a schematic diagram of the third embodiment of the present invention.

Other than the first and the second embodiments, a non-sampling-based Q-factor measuring apparatus of the present invention can also be realized by a cross polarization modulation (XPM) mechanism and a semiconductor optical amplifier. For example, a broadband ASE light source is connected to a polarization beam splitter, and combined with the input signals via an optical coupler. Then the combined optical signals are fed into the semiconductor optical amplifier. The output of the SOA connects to an optical polarization controller and a linear polarizer. The whole unit is then finished by an optical spectrum analyzer to do the post wavelength analysis. FIG. 10 shows a schematic diagram of the third embodiment of the present invention.

Referring to FIG. 10, this non-sampling-based Q-factor measuring apparatus uses a tunable laser source (TLS) 1001 and an amplified spontaneous emission light source 1002.

The input optical signals from the tunable laser source 1001 alter the internal optical refraction index of the semiconductor optical amplifier 1003, wherein the optical refraction index is a function of wavelength. Another input optical signal from the ASE light source 1002, via a polarization beam splitter 1004, integrates all polarized directions for ingredient waves. The signal beam from the ASE light source 1002, which can be viewed as an integration of narrow band optical signals with various wavelengths, combines the signals from the tunable laser source 1001 through an optical coupler 1005. Through the semiconductor optical amplifier 1003, every single narrow band optical signal, with a different wavelength, is deflected with a different angle and results in a different polarization directional variation.

The output of the semiconductor optical amplifier 1003 connects to an optical polarization controller 1006. The output of the optical polarization controller 1006 connects to a linear polarizer 1007. Every narrow band optical beam, after passing through the optical polarization controller 1006 and the liner polarizer 1007, whose ingredient light waves with the polarized direction right intersecting with the linear polarizer 1007, are blocked/screened out and form the notch marks on the waveband spectrum. This implies that the wavelength of the notch marks is correlated to the deflective degree of the optical signals, which are from the ASE light source 1002 and deflected within the semiconductor optical amplifier (SOA) 1003. The deflective degree of an input optical beam is, again, directly related to the power of the input optical signals. By adding an optical spectrum analyzer 1008 to interpret the optical wavelength and analyze the notch mark wavelength variations, the power variation for the input optical signals can be obtained and the Q-factor is easily measured. This embodiment of the present invention demonstrates another non-sampling-based mechanism for a Q-factor measuring without the drawbacks and restrictions of a conventional mechanism for signal sampling.

Figure 11:
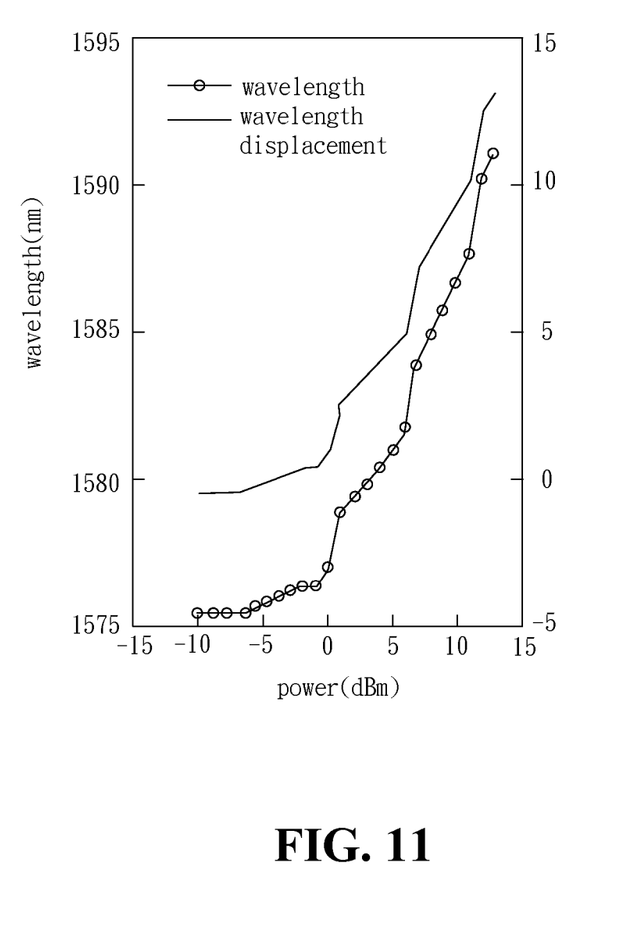
FIG. 11 illustrates the relationship between the V notch wavelength displacement from the ASE optical signals and the power variation of the input optical signals.

The measuring result from the experimental simulation shows that different optical power values from the spontaneous emission light source result in different optical notch wavelengths. FIG. 11 shows the relationship between the optical power variation and the corresponding notch wavelength from the spontaneous emission light source. The horizontal axis represents the optical power (in dBm) of the input signals. The left vertical axis represents the notch wavelength (in nm) of the optical signals from the ASE light source. The right vertical axis represents the displacement (in nm) of the notch wavelength. From the wavelength displacement curves shown in FIG. 11, the corresponding wavelength displacements for the input signal power ranging from −5 dBm to 12 dBm is 0 nm to 13 nm. The curve with circles is the one with actual wavelengths. FIG. 11 shows that the notch wavelength for the signals from the spontaneous emission light source retains pretty good linearity, so that it can be used for measuring the Q-factor for the input optical signals.

In conclusion, the non-sampling-based Q-factor measuring apparatus and method according to the present invention use an optical power conversion module to transform the optical power variation for input optical signals in time domain into variation in a non-time domain to replace the complicated conventional sampling mechanism to obtain the Q-factor measurement. The measuring apparatus has advantage of being simple structured and has high value in industrial applications, which thus qualifies itself as an invention.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A non-sampling-based Q-factor measuring apparatus comprising:
    an optical power conversion module for converting an input optical signal having first and second signal power levels both with variation in time domain into an output optical signal having first and second output optical components, said first output optical component having variation in a non-time domain corresponding to the variation of said first signal power level in said time domain, and said second output optical component having variation in said non-time domain corresponding to the variation of said second signal power level in said time domain;
    a non-time domain variation analyzing mechanism for receiving said output optical signal and determining a first mean and a first standard deviation for the variation of said first output optical component in said non-time domain, and a second mean and a second standard deviation for the variation of said second output optical component in said non-time domain;
    wherein said measuring apparatus computes said Q-factor for said input optical signal according to said first and second means and said first and second deviations.

2. The non-sampling-based Q-factor measuring apparatus as claimed in claim 1, wherein said first output optical component has variation in optical wavelength corresponding to the variation of said first signal power level, and said second output optical component has variation in optical wavelength corresponding to the variation of said second signal power level.

3. The non-sampling-based Q-factor measuring apparatus as claimed in claim 2, wherein said optical power conversion module is a power-to-wavelength conversion module that converts said variations of said first and second signal power levels into variations of optical wavelength of said first and second output optical components, and said non-time domain variation analyzing mechanism comprises:
    an optical filter that separates said first and second output optical components into different output ports according to the wavelength of said output optical signal; and
    photo detectors that receive said output optical signal from said different output ports.

4. The non-sampling-based Q-factor measuring apparatus as claimed in claim 3, wherein said power-to-wavelength conversion module is a tunable laser.

5. The non-sampling-based Q-factor measuring apparatus as claimed in claim 3, wherein said optical filter is an optical multiplexer.

6. The non-sampling-based Q-factor measuring apparatus as claimed in claim 3, wherein said photo detectors are photodiodes.

7. A non-sampling-based Q-factor measuring method, comprising the steps of:
    (a) converting an input optical signal having first and second signal power levels both with variation in time domain into an output optical signal having first and second output optical components, said first output optical component having variation in a non-time domain corresponding to the variation of said first signal power level in said time domain, and said second output optical component having variation in said non-time domain corresponding to the variation of said second signal power level in said time domain;

(b) determining a first mean and a first standard deviation for the variation of said first output optical component in said non-time domain, and a second mean and a second standard deviation for the variation of said second output optical component in said non-time domain; and (c) computing said Q-factor for said input optical signal according to said first and second means and said first and second deviations.

8. The non-sampling-based Q-factor measuring method as claimed in claim 7, wherein said first output optical component has variation in optical wavelength corresponding to the variation of said first signal power level, and said second output optical component has variation in optical wavelength corresponding to the variation of said second signal power level.

* * * * *